(12) United States Patent
Powell et al.

(10) Patent No.: US 8,799,311 B2
(45) Date of Patent: Aug. 5, 2014

(54) INTELLIGENT DATA CACHING

(75) Inventors: Wesley Powell, San Jose, CA (US);
Adam Ward, San Jose, CA (US);
Edward L. Ford, Santa Clara, CA (US);
Peter Nelson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 667 days.

(21) Appl. No.: 12/941,007

(22) Filed: Nov. 5, 2010

(65) Prior Publication Data
US 2012/0117509 A1      May 10, 2012

(51) Int. Cl.
*G06F 17/30* (2006.01)

(52) U.S. Cl.
USPC .......................................................... 707/769

(58) Field of Classification Search
CPC ............................... G06F 17/30528
USPC ....................................................... 707/769
See application file for complete search history.

(56) References Cited

U.S. PATENT DOCUMENTS

| | | | |
|---|---|---|---|
| 6,813,690 B1 | 11/2004 | Lango et al. | |
| 7,080,060 B2 | 7/2006 | Sorrentino et al. | |
| 7,587,398 B1 | 9/2009 | Fredricksen et al. | |
| 8,103,739 B1 * | 1/2012 | Gautier | 709/217 |
| 2002/0178290 A1 * | 11/2002 | Coulthard et al. | 709/246 |
| 2004/0249785 A1 * | 12/2004 | Gauweiler | 707/1 |
| 2007/0073989 A1 * | 3/2007 | Sharma et al. | 711/165 |
| 2010/0138432 A1 * | 6/2010 | Noyes | 707/758 |
| 2010/0153836 A1 | 6/2010 | Krassner et al. | |

* cited by examiner

*Primary Examiner* — Huawen Peng
(74) *Attorney, Agent, or Firm* — Fish & Richardson P.C.

(57) ABSTRACT

Methods, program products, and systems implementing intelligent data caching are disclosed. A client can send a request for data to a server. The request can include a query and a query context. The query can retrieve more data than can be displayed in a current page. The query context can specify a quantity of data records that can be displayed in the current page. The client can receive from the server two sets of data in response to the request. The first set of data can include row identifiers of data records that satisfy the query. The second set of data can include data records that can be displayed in the current page. The client can store the two sets of data in one or more buffers (e.g., two buffers) and update buffer(s) when different data records are displayed (e.g., when a user scrolls through pages).

20 Claims, 10 Drawing Sheets

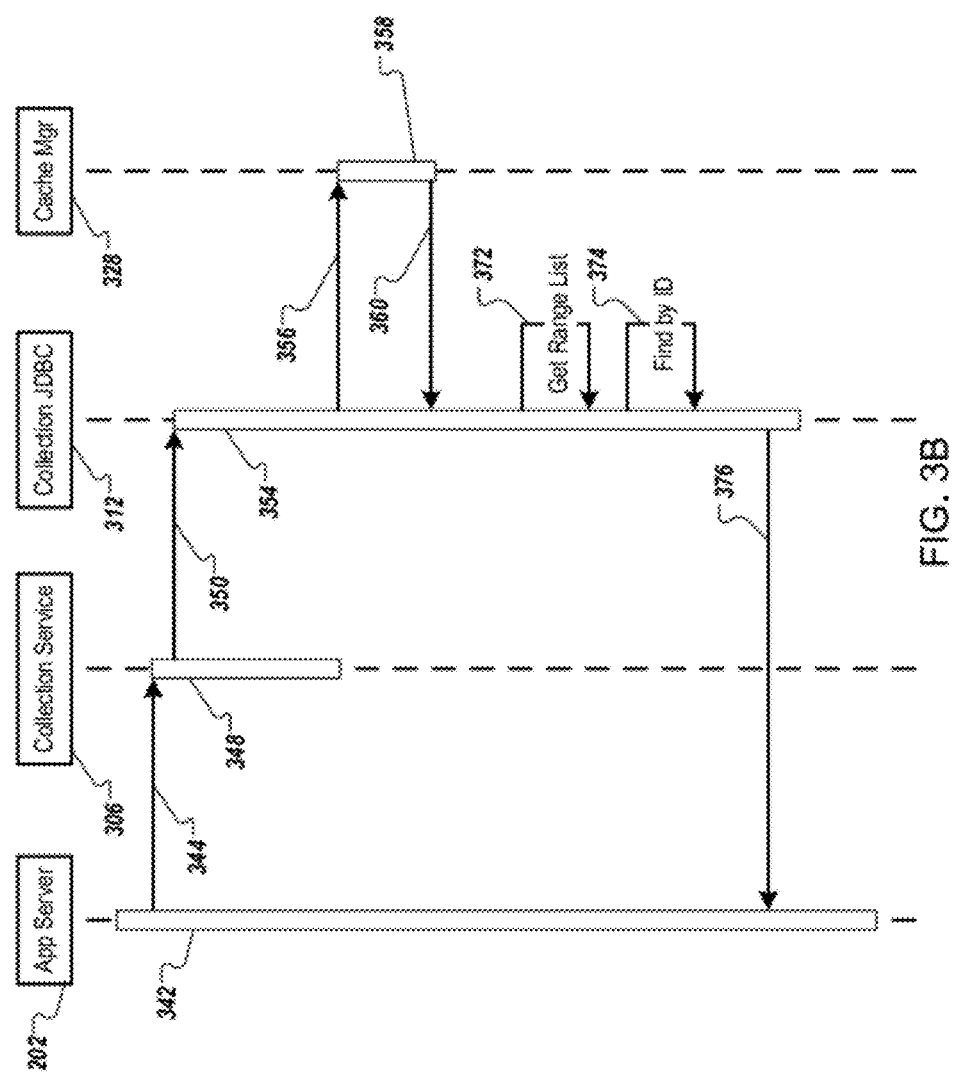

INTELLIGENT DATA CACHING

TECHNICAL FIELD

This disclosure relates generally to data management.

BACKGROUND

A client device, such as a smart phone, can execute various application programs that access one or more data stores. The application programs can include, for example, a database reporting program that is configured to display a formatted view of data stored in the one or more data stores, or a database editing program that is configured to update the data in the one or more data stores. The data stores can be hosted on server computers that are located remotely from the client device. For the application programs to access the data stores, the client device can utilize one or more connections to the data stores through a communications network.

The application program can generate a data report to be displayed on a display screen of the client device. The display screen may not be sufficiently large to display the data report in the entirety. For example, the data report can include hundreds or thousands of rows or columns of data. At any given time, the display screen can only legibly display a portion of the rows of data of the data report. A user interface (e.g., a "previous page" control and a "next page" control) can be utilized to allow a user to browse through the data report.

SUMMARY

Methods, program products, and systems implementing intelligent data caching are disclosed. A client can send a request for data to a server. The request can include a query and a query context. The query can retrieve more data than can be displayed in a current page. The query context can specify a quantity of data records that can be displayed in the current page. The client can receive from the server two sets of data in response to the request. The first set of data can include row identifiers of data records that satisfy the query. The second set of data can include data records that can be displayed in the current page. The client can store the two sets of data in one or more buffers (e.g., two buffers) and update the buffer(s) when different data records are displayed (e.g., when a user scrolls through pages).

In some implementations, on a server, a result set can be retrieved from a database in response to a query from a client. The result set can include multiple data records, each data record corresponding to an identifier. The identifiers of all data records can be sent to the client along with a portion of the result set and a size of the result set. The portion of the result set can include data records that can be displayed at the client in a current display. The server can receive an update request from the client when a user scrolls through a displayed data record. Upon receiving the update request, the server can send a second portion of the result set to the client. The server can keep the result set up to date by synchronizing the result set with data in the database to allow changes subsequent to the query to be reflected in the second portion of the result set.

In some implementations, intelligent data caching can provide paging functions for dividing a large row set into multiple pages, such that a user can scroll through pages of data. When a client request data using a query, a server can query a database for all row identifiers for N rows of data retrieved by the query. The server can send a portion (M rows) of the data to the client. The server can also send to the client a query handle for subsequent paging requests and a query size. To display another page, the client can send the query handle and query options, including a row offset, a row limit, and a cache refreshing data (e.g., a flag), to the server in a subsequent data request. The server can respond by querying the database using the query handle and the row identifiers and fetch the rows of data from the database. The client requests the server to re-execute the query by sending the query handle with the cache refreshing data set to indicate that cache refreshing is needed. A row identifier of a data row can include an identifier, such as a rowID of a database, that is embedded in the data row. In some implementations, the row identifier can include an identifier external to the data row. The external identifier can be used in conjunction with the server-provided query handle to identify a list. For example, the external identifier can include an index. The index can facilitate cheap delete operations, e.g., deleting all rows in indices 100 through 5,000.

These and other implementations can be utilized to achieve one or more of the following advantages. Intelligent data caching can reduce data traffic between a client and a server. A conventional database tool can send all results of a query to a client. By comparison, intelligent data caching allows a server to send only data that can be currently displayed, thus reducing the amount of data sent. In addition, intelligent data caching can reduce the amount of processing that occurs on the client. Intelligent data caching can allow a user to view up-to-date data at the client. When a user scrolls to a section of the result set, data of the section are retrieved just in time. The data can be synchronized with the data in the database. Intelligent data caching can allow multiple users to work on a database in collaboration. The just-in-time display of data records can reduce potential conflicts when a use edits currently displayed data.

The details of one or more implementations of intelligent data caching techniques are set forth in the accompanying drawings and the description below. Other features, aspects, and advantages of dynamic parsing rule will become apparent from the description, the drawings, and the claims.

BRIEF DESCRIPTION OF THE DRAWINGS

FIGS. 3A and 3B are sequence diagrams illustrating interactions between various subsystems and processes implementing intelligent data caching.

Like reference symbols in the various drawings indicate like elements.

DETAILED DESCRIPTION

Exemplary Intelligent Data Caching System

Figure 1:
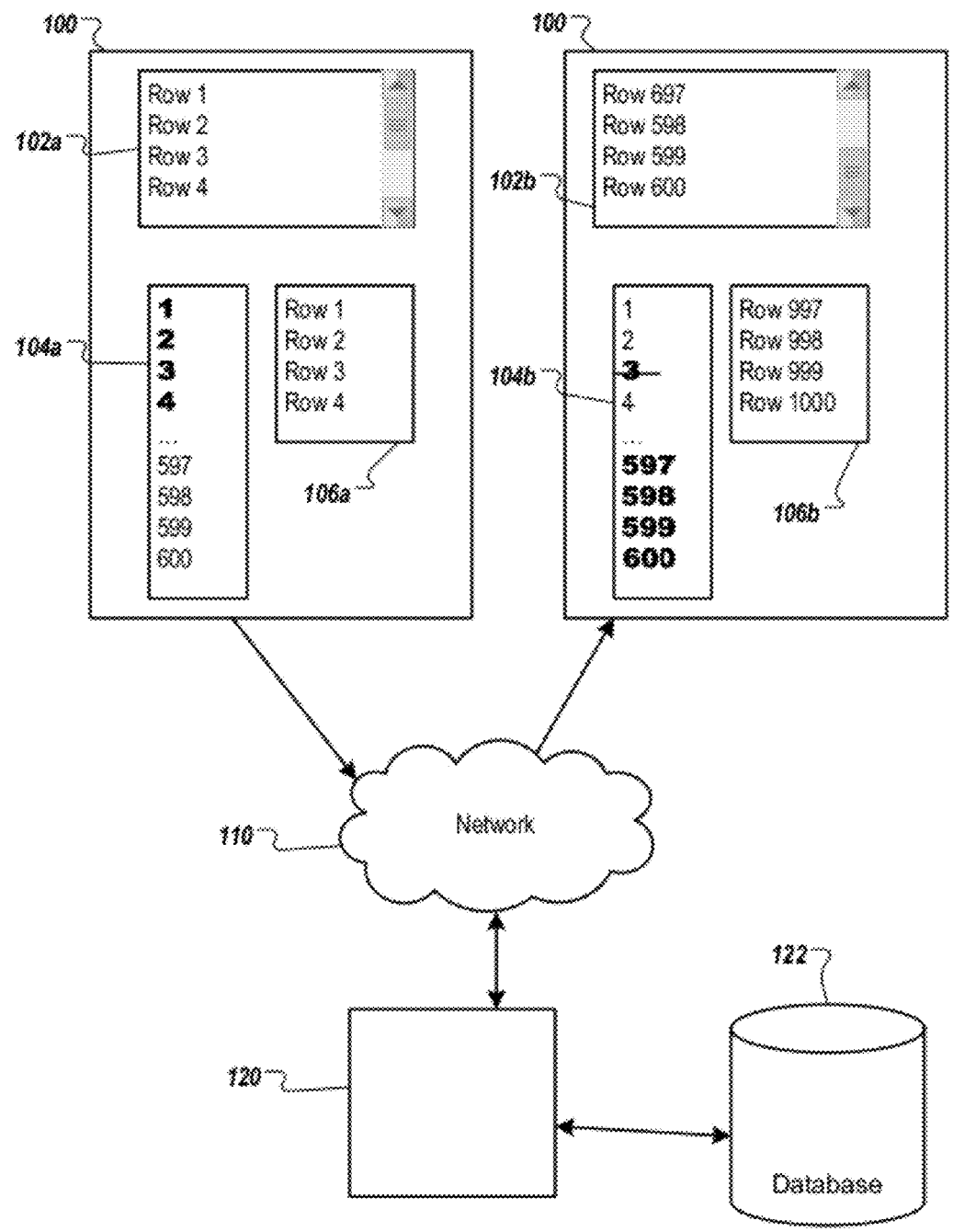
FIG. 1 is a block diagram illustrating an exemplary use case of intelligent data caching.

FIG. 1 is a block diagram illustrating an exemplary use case of intelligent data caching. The intelligent data caching techniques will be described in reference to a database application program executing on client 100.

Client 100 can be a computing device operable for being connected to server 120 through communications network 110. Server 120 can include or be coupled with or connected to database 122. The application program on client 100 can include a database reporting program that is configured to retrieve one or more data records from database 122, format the retrieved data records according to a layout, and display the formatted data records in display area 102a.

The application program, upon execution, can generate a query that can retrieve a number (e.g., 600) of data records from database 122. The application program can determine a number (e.g., four) of data records that can be displayed in display area 102a based on a physical size of a display screen on client 100, a configuration of display area 102a (e.g., a window size), a configuration of the layout (e.g., a height of each data record to be displayed or a total number of rows to display on one page), or any combination of the above.

The application program can make a data request to server 120. The data request can include the query and a query context. The query context can include a count of data records to be processed. The count of data records can be a number of data records that can be displayed in display area 102a, or any number (e.g., 2× number of data records that can be displayed). The query context can include offset specifying from which data record (e.g., record 1) the number of data records that are to be retrieved.

Client 100 can receive a response from server 120. The response can include data identifiers, data records, and a data size. The data identifiers can include row identifiers (e.g., row identifiers "1" through "600") of the data records that satisfy conditions specified in the query. The data records can be a portion (e.g., data records one through four) of all data records that satisfy conditions specified in the query and the count. For example, the data records can be a portion of all data records that can be displayed in a page in display area 102a, starting from the offset (e.g., record 1). The data identifiers and data records can be stored in data identifier buffer 104a and data record buffer 106a, respectively. The data size in the response can specify a total number of data records that match the query (e.g., 600).

The application program executing on client 100 can access data record buffer 106a and provide the data records in data record buffer 106a for formatting and displaying in display area 102a. Display area 102a can include a scroll bar. The scroll bar can include a slider displayed at a location of the scroll bar that corresponds to the position of the displayed data records in relation to all the data records. The application program can receive an input (e.g., a drag on the slider) through the scroll bar. The input can cause other data records to be displayed. For example, an input dragging the slider to the bottom of the scroll bar can cause the last data records that match the search query to be displayed.

Upon receiving the input, the application program can send a second data request to server 120. The second data request can include a number of data records to be displayed (e.g., four) and an offset (e.g., 597). The number of data records in the second data request can differ from the number of data records in the first request, for example, when the layout is changed or when a display size of display area 102a is adjusted. In some implementations, the second request can include data identifiers (e.g., "597" through "600") that correspond to the new data records to be displayed.

Client 100 can receive the data records that correspond to the data records specified in the second request and store the data records in data record buffer 106b. The application program can provide the data records in data record buffer 106b for formatting and displaying in display area 102b. The data records stored in data record buffer 106b can be stored in contiguous sections or non-contiguous sections of data record buffer 106b.

Data in database 122 can change between the time of the first data request and the second request. In some implementations, server 120 can receive a notification from database 122 when a data record changes, when a new data record is inserted, or when a data record is deleted. In some implementations, server 120 can perform the query a second time. If a data record is inserted or deleted, server 120 can send a message to client 100 to update content of the data identifier buffer. For example, when a record having an identifier "3" is deleted, server 120 can send the message to client 100 such that data identifier "3" can be deleted from data identifier buffer 104b.

Exemplary Architecture

Figure 2:
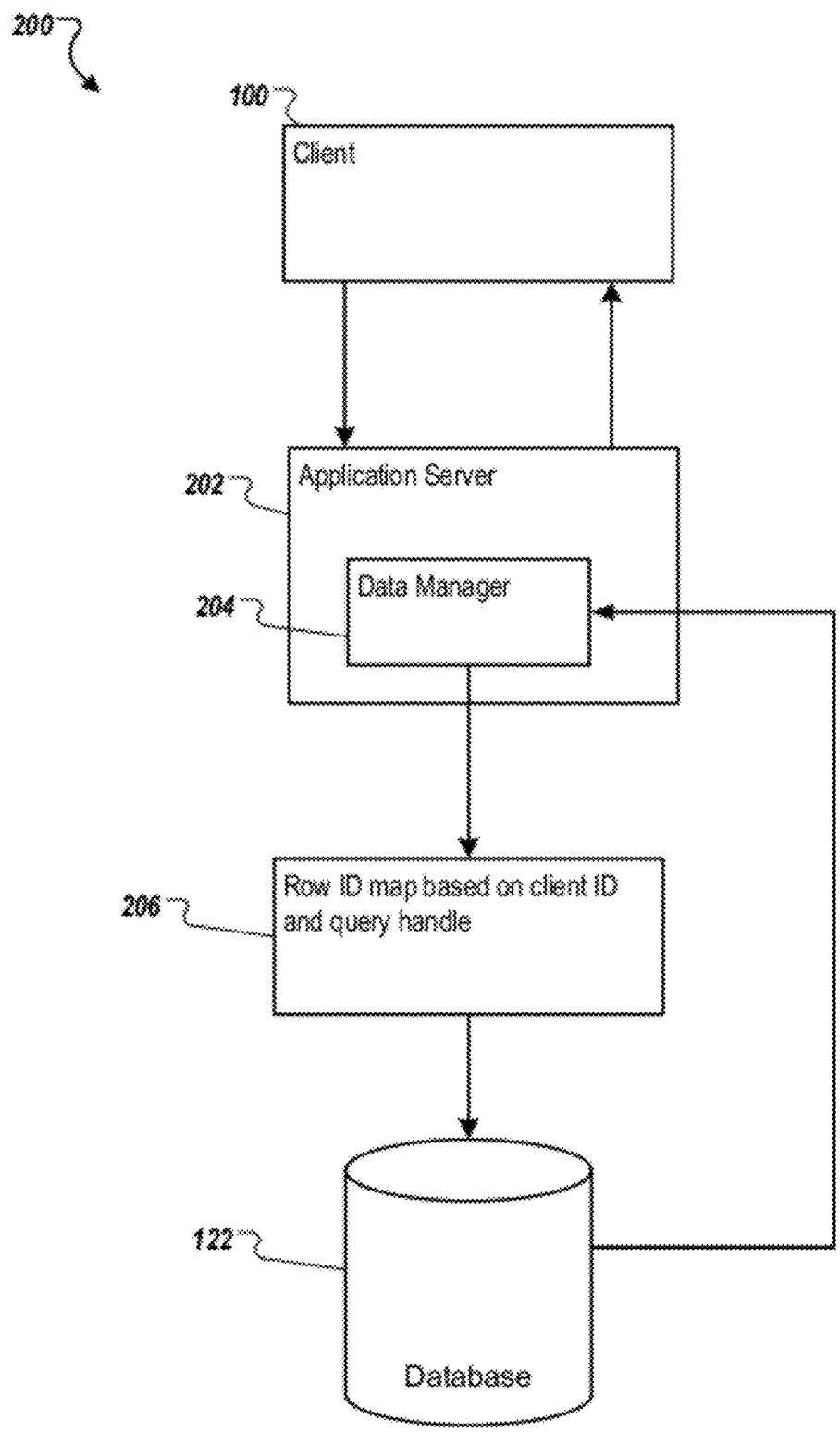
FIG. 2 is a block diagram illustrating an exemplary architecture of intelligent data caching.

FIG. 2 is a block diagram illustrating exemplary architecture 200 of intelligent data caching. Client 100 can send a data request through a communications network to application server 202. Application server 202 can be part of server 120 as described above in reference to FIG. 1. Application server 202 can include data manager 204 for performing database related operations. The data request can include various components, as described above in reference to FIG. 1. In some implementations, the data request can include a client identifier identifying client 100.

In response to the data request, data manager 204 can send a request to paging cache 206. Paging cache 206 can store a data identifier (e.g., row identifier) map. The row identifier map can correspond to a client identifier and a query (or query handle) to allow different clients to have different row identifier maps, and to allow different queries of a same client to have different row identifier maps. Paging cache 206 can be created at the first time when application server 202 receives the data request containing a specific query, and be utilized to intelligently retrieve data upon subsequent data requests. Paging cache 206 can keep all row identifiers of rows that match the query, including row identifiers that have been deleted.

If paging cache 206 has already been created, a simplified query can be performed on database 122. The simplified query can fetch data records based on row identifiers or an index and an offset or both, as specified in the data request. The simplified query can have the following example format:

SELECT*

FROM example_table

WHERE row_id in(2,10,13,18,36,38)  (1)

Data manager 204 can receive data records retrieved by the simplified query, as well as a query size. Data manager 204 can send the data records and the query size to client 100.

In some implementations, the data records sent to client 100 can include more than can be displayed on a current page. The query context sent from client 100 to application server 202 can specify a number of records that is greater than the number of rows that can be displayed on a single page, to avoid frequent request when a user browses the records. In addition, a database application program executing on client 100 can present nested query results that include multiple levels of data records. For example, an employee list can have a first level (e.g., regional offices) and a second level (e.g., employee in each office). Data manager 204 can send data records of all employees of regional offices currently displayed on client 100. Client 100 can store the data records in a data record buffer. To render the data records, client 100 can walk a data identifier buffer to obtain the correct index or offset of the data records in the data record buffer for visualization. If a specified null indicator is encountered, client 100 can send a new data request to application server 202. The null indicator can be a value null or an arbitrary and configurable pre-defined value.

Exemplary Interactions Between Subsystems

Figure 3A:
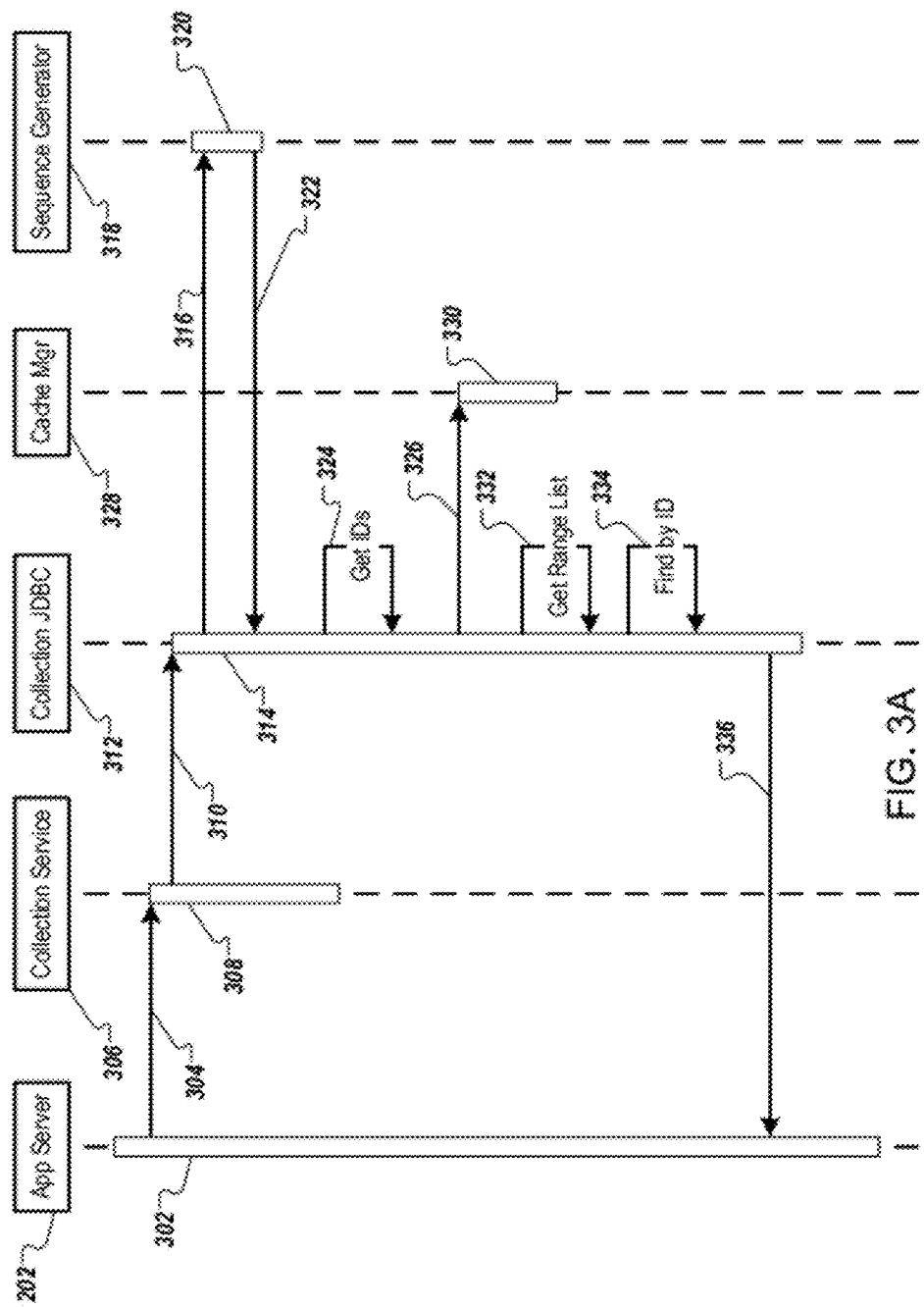

FIGS. 3A and 3B are sequence diagrams illustrating interactions between various subsystems and processes implementing intelligent data caching. FIG. 3A is a sequence diagram illustrating interactions between various subsystems and processes in response to an initial data request. The initial data request is a data request made by a client when no data records exist in cache for the client or for a particular query of the client.

In response to receiving the initial data request, application server 202 can invoke process 302 for retrieving an initial result set. Process 302, as well as other processes that will be described below, can include execution of a sequence of instructions of a function or a method or execution of a sequence of instructions of an application program. The processes can be independent processes managed by an operating system, or sections of one or more processes managed by an operating system. Process 302 can send message 304 to collection service 306. Collection service 306 can include a set of utilities for manipulating collections, which can be groups of data records in a database. Message 304, as well as other processes that will be described below, can include an instantiation of an object, or a function or method call. Message 304 can include information from the initial data request and other information. For example, message 304 can include a function call having parameters specifying a client identifier, a query, a tenant identifier, and query options. The tenant identifier can store a value that can identify a tenant, which can be a workgroup including one or more users. The query options can include an offset and a limit. The offset and limit can correspond to the offset and the number of records to retrieve, respectively, as specified in the initial data request.

Upon receiving message 304, collection service 306 can invoke process 308 for getting collections. Process 308 can send message 310 to database interface service 312. Message 310 can include the client identifier, the query handle, the query, the tenant identifier, and the query options. Database interface service 312 can include, for example, Java® database connectivity (JDBC) data access objects. Upon receiving message 310, database interface service 312 can invoke process 314 for retrieving data records and creating a data cache.

Process 314 can send message 316 to sequence generator 318. Message 316 can include a request for new query handle from sequence generator 318, based on the query. Sequence generator 318 can create the query handle using process 320, and return the query handle to process 314 in message 322. In some implementations, sequence generator 318 can include a 32-bit integer sequence generator. The 32-bit integer sequence generator can generate unique identifiers for query handles until reaching a limit of $2^{32}$. In some implementations, sequence generator 318 can include a hash (e.g., an MD5 hash) of a query string per session. The hash can generate a unique identifier per session. In some implementations, sequence generator 318 can include a 64-bit long integer sequence generator using 16 bits per server, 32 bits per page, and 16 bits to be used as a counter. The 64-bit long integer sequence generator can generate unique identifiers for query handles until reaching a limit by the page and counter ($2^{48}$).

Process 314 can retrieve (324) all data identifiers (e.g., row identifiers) for the query using the query handle. Process 314 can send message 326 to cache manager 328. Message 326 can include a function call to invoke process 330 on cache manager 328. The function call can have parameters including client identifier, query handle, a query string, and the data identifiers. Process 330 can store the query handle, a query string, and the data identifiers in cache in association with the client identifier.

Process 314 can determine (332) a list of data identifiers based on the query options. For example, the list can include a range of row identifiers based on an offset and a limit as specified in the query options. Process 314 can issue (334) a find by identifier request to a database to get a list of data records. Having received the list of data records, process 314 can construct a query result. The query result can include the list of data records and a total size, and return (336) the query result to process 302. At any stage, process 314 can determine if an error has occurred. If an error is detected, process 314 can throw an exception to collection service 306 or application server 202.

FIG. 3B is a sequence diagram illustrating interactions between various subsystems and processes in response to data request that was sent subsequent to the initial data request. In response to receiving a subsequent data request, application server 202 of an application server can invoke process 342 for retrieving a result set.

Process 342 can send message 344 to collection service 306. Message 344, can include information from the subsequent data request and other information. For example, message 344 can include a function call having parameters specifying a client identifier, a query, a tenant identifier, a query handle, and query options. The query handle can be a query handle created in response to the initial data request. The query options can include an offset and a limit. The offset and limit can correspond to the offset and the number of records to retrieve, respectively, as specified in the initial data request. The query options can include a refresh flag. If the refresh flag is set to true, collection service 306 can work in a way that is similar to responding to an initial data request, except for reusing the query handle instead of generating a new query handle.

Upon receiving message 344, collection service 306 can invoke process 348 for getting collections. Process 348 can send message 350 to database interface service 312. Message 350 can include the client identifier, the query handle, the query, the tenant identifier, and the query options. Upon receiving message 350, database interface service 312 can invoke process 354 for retrieving data records from a data cache.

Process 354 can send message 356 to cache manager 328. Message 356 can include a function call having parameters including a client identifier and a query handle. In response to message 356, cache manager 328 can invoke process 358 for retrieving data identifiers from cache. Process 358 can return (360) a list of the retrieved data identifiers to process 354. A cache managed by cache manager 328 can be memory space associated with attributes listed below in Table 1.

TABLE 1

Cache Attributes

| Attribute | Note |
|---|---|
| timeToIdleSeconds | Specifies time to idle (e.g., a maximum amount of time between accesses) for an element in the cache before the element expires. This attribute can be used if the element is not eternal. A value of 0 can allow the element to idle for infinity. Default value can be 0. |
| timeToLiveSeconds | Specifies a time to live of an element before the element expires. |
| diskPersistent | Specifies whether a disk store persists between restarts. |
| maxElementsInMemory | Specifies a maximum number of elements that can be created in memory |
| maxElementOnDisk | Specifies a maximum number of elements that can be maintained in a disk store. Default value can be 0, allowing unlimited storage |
| eternal | Specifies whether elements in the cache are eternal. If eternal, timeouts can be ignored and the elements are not expired. |

The cache can be invalidated by cache manager 328 when a user logs out, when a session times out, or thresholds set by the timeToIdleSeconds and timeToLiveSeconds attributes are reached.

Process 354 can determine (372) a return list of data identifiers based on the query options. For example, the return list can include a range of row identifiers based on an offset and a limit as specified in the query options. Process 354 can issue (374) a find by identifier request to a database to get a list of data records. The data records retried from the database can have a different record count compared to the limit specified in the query options. A data record can be deleted after an identifier of the data record is cached by cache manager 328. Process 354 can delete the identifier that corresponds to a record that is missing from data records retrieved from the database. Process 354 can backfill the empty space left by the deleted record by submitting another query to the database. At any stage, process 354 can determine if an error has occurred. If an error is detected, process 354 can throw an exception to collection service 306 or application server 202.

Having received the list of data records, process 354 can construct a query result. The query result can include the list of data records and a total size, and return (376) the query result to process 342.

Figure 4:
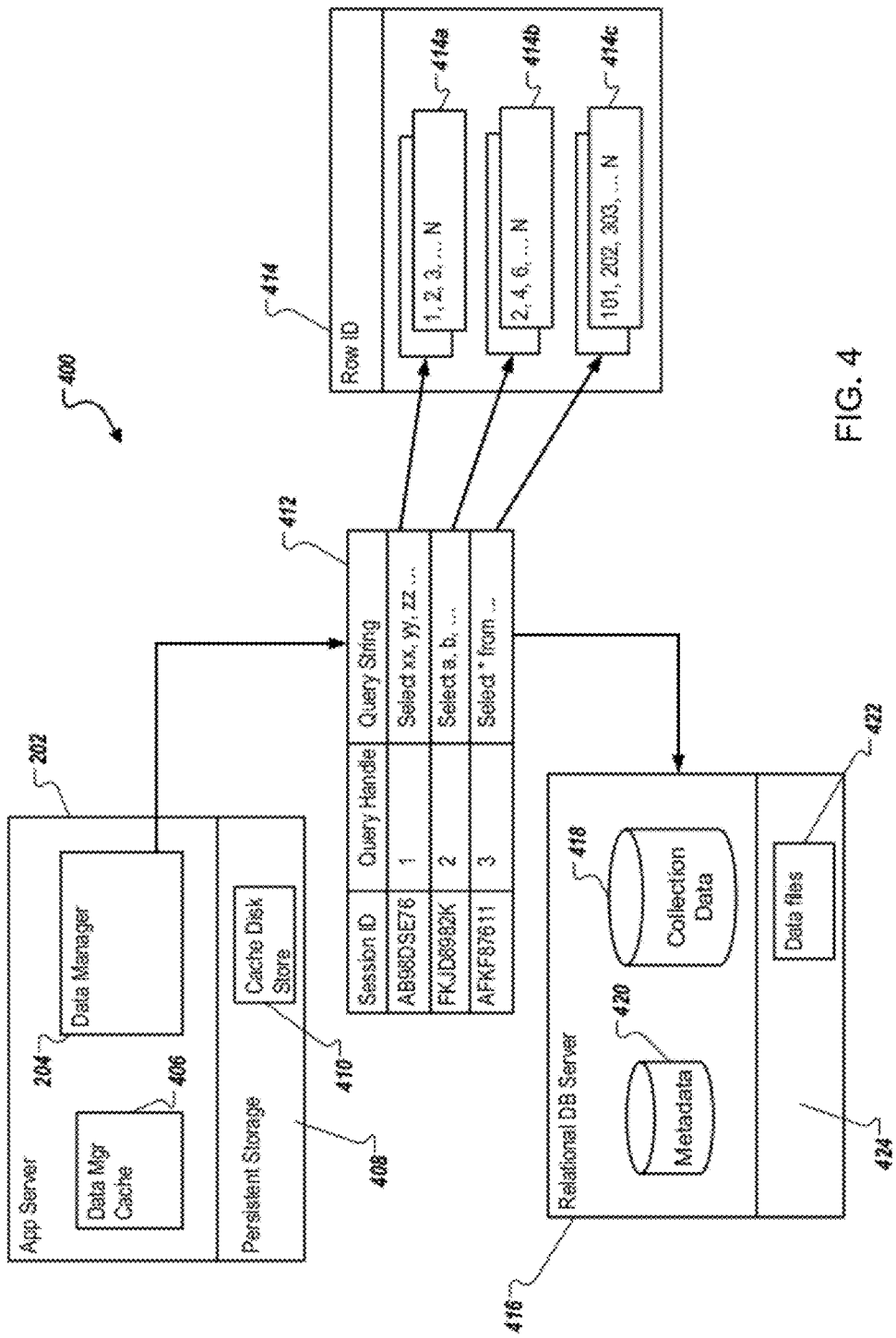
FIG. 4 is a block diagram illustrating interactions between various server subsystems.

FIG. 4 is a block diagram illustrating interactions between various server subsystems. Application server 202 can include data manager 204. Data manager 204 can interact with cache 406. Cache 406 can be a memory space being managed under various management policies including, for example, least recently used (LRU), least frequently used (LFU), and first-in, first-out (FIFO) policies. Managing cache 406 can include providing disk overflow functions. The disk overflow functions can store at least a portion of cached data on persistent storage device 408 in cache disk store 410. Persistent storage device 408 can include, for example, a disk storage device.

Cache 406 can store session map 412 and row identifier map 414. Session map 412 can store one or more session records. Each session record can have a session identifier identifying a session. The session can be an interactive information exchange between a client and application server 202. The session record can include query handle, which can be a unique identifier identifying a query. The session record can include a query string, e.g., a SQL SELECT statement.

The query strings in session map can be used to access one or more databases hosted on database server 416. Database server 416 can be a relational database server that stores collection data 418, including one or more data records of one or more database tables. Database server 416 can be a relational database hosted on database server 416. Database server 418 can store metadata 420 of one or more files 422. Files 422 can include unstructured data (e.g., data not defined in a schema of a relational database) stored in persistent storage space (e.g., disk space) 424. Metadata 420 can store relations between files 422 and data records in collection data 418 such that a file can be retrieved using a query of session map 412.

Each session map can correspond to a set of row identifiers 414a, 414b, or 414c. The row identifiers in each set can be populated by data manager 204 in response to an initial data request from a client or a subsequent data request having refreshing flag set to true. The row identifiers in each set can be populated by data manager 204 when, during a subsequent data request, data manager 204 determines rows have been added to a database table or deleted from a database table.

In addition, a session record in session map 412 and a corresponding row identifier set in row identifier map 414 can be invalidated when application server 202 receives a query from a client that has a same query handle as the query handle stored in the session record. The cache for a client can be cleared when the client logs out, or when a session times out.

Figure 5:
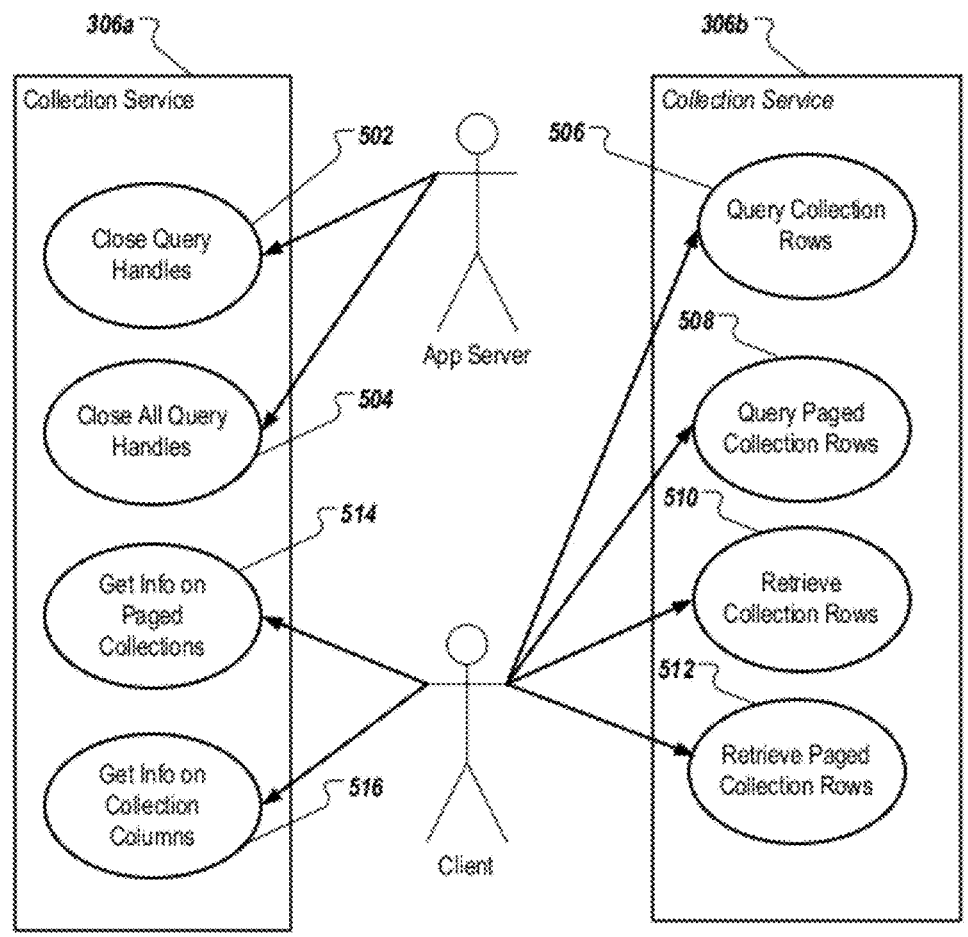
FIG. 5 is a use case diagram illustrating example functions of collection service.

FIG. 5 is a use case diagram illustrating example functions of collection service 306. For clarity, collection service 306 is shown in two parts: collection service 306a and collection service 306b. An application server can call close query handle function 502 or close all query handles function 504 provided by collection service 306a. Close query handle function 502 or close all query handles function 504 can be called to clear the cache for a client when the client logs out, or when a session of the client times out. A client identifier can be a parameter of close query handle function 502 and close all query handles function 504.

A client can call query collection rows function 506 to query all data records that match a query, or query paged collection rows function 508. Query paged collection rows function 508 can create a query data object. The query data object can include a list of column-value criteria for querying a database. A column-value criterion can include a column field, an operator, and a value. Column-value criteria can nest inside of each other. The nesting can be achieved using logical operators. The logical operators can include Boolean operators AND or OR. Column-value criteria can nest within each other in the following example: "Column 1 contains 'Bob' OR (Date Modified equals yesterday AND Last Name equals 'Logan')." The query data object can include order semantics. The order semantics can include a column field, and options for ascending order or descending order. Query paged collection rows function 508 can be invoked with parameters including client identifier, query handle, tenant identifier, collection identifier, and query options as parameters. The query options can be a data object having attributes specified below in Table 2.

TABLE 2

Query Options Data Object

| Name | Type | Description |
|---|---|---|
| isRefresh | Boolean | A flag that specifies if a query is to be refreshed |
| offset | int | Offset of the query |
| limit | int | Number of records to be retrieved by the query |

A client can call retrieve collection rows function 510 to retrieve all data records that match a query, or retrieve paged collection rows function 512, with client identifier, query handle, tenant identifier, collection identifier, offset, and limit as parameters. Retrieve paged collection rows function 512 can return a query result data object. The query result data object can have attributes specified below in Table 3.

TABLE 3

Query Result Data Object

| Name | Type | Description |
| --- | --- | --- |
| rowList | list | List of rows |
| queryHandle | string | A query handle |
| isDone | Boolean | A flag indicating that the list of rows is at an end of a result set |
| totalSize | int | A total size of a query |
| size | int | A size of a current page |

The client can call get information on paged collection function 514 to retrieve information about a list of collections. The client can call get information on collection columns function 516 to retrieve information about columns.

Exemplary User Interface

Figure 6:
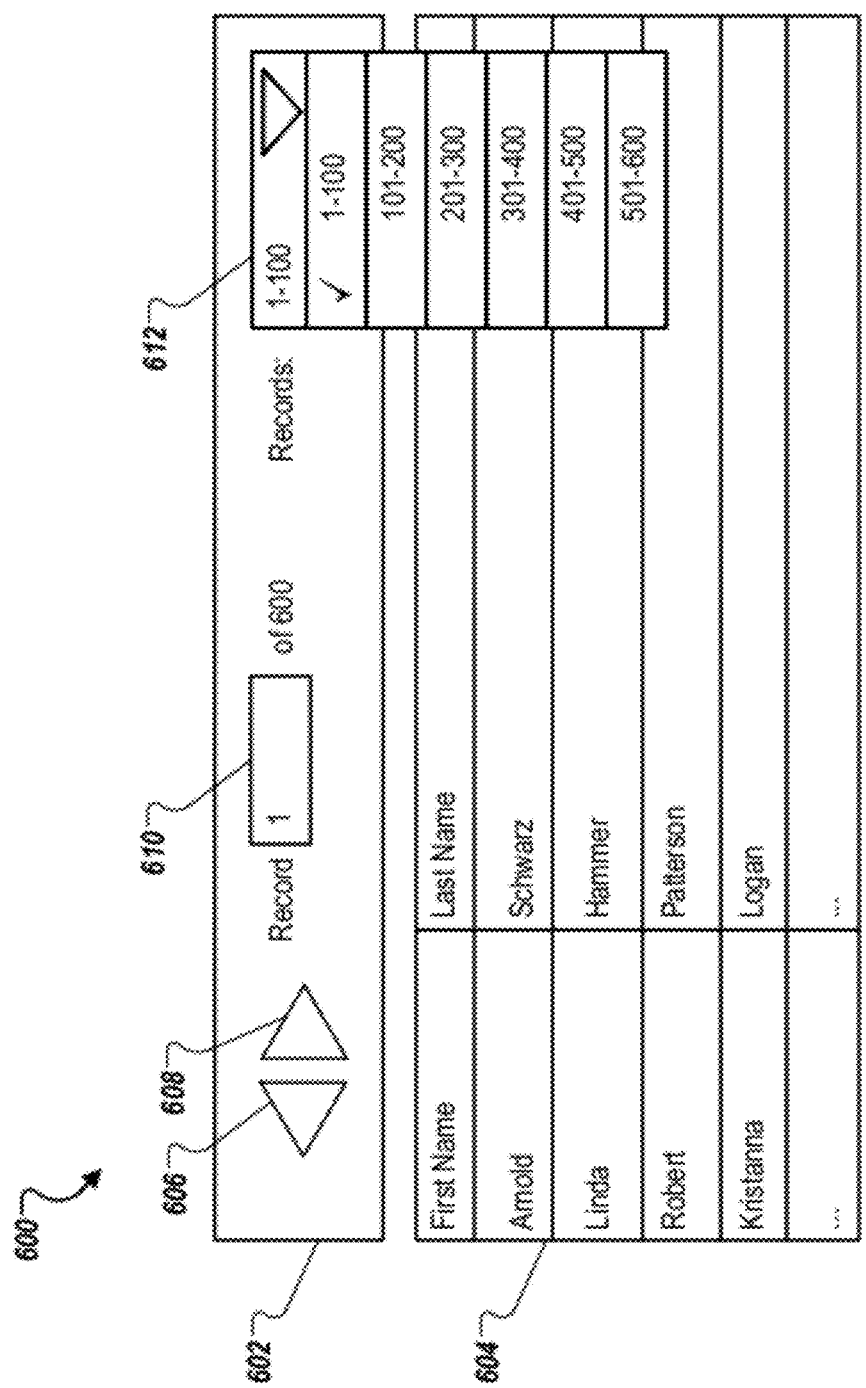
FIG. 6 illustrates an exemplary user interface for paging.

FIG. 6 illustrates exemplary user interface 600 for paging. User interface 600 can be displayed on a display device of a client. User interface 600 can include control portion 602 and data display section 604.

Data display section 604 can display one or more data records. The number of data records displayed can be limited. For example, data display section 604 can be configured to display 100 records at a time, as one page. Each page can correspond to a set of data records stored in a data record buffer or to be stored in the data record buffer on the client.

Control section 602 can include various controls that enable a user to browse through pages of data. The controls can include previous record button 606, next record button 608, input area 610 for direct record access, and page navigator 612. Other controls (e.g., scroll bars, slide rules, page navigation links) can also be implemented. The controls can be associated with a record identifier buffer of the client. For example, when the record identifier buffer includes 600 records and 100 records can be displayed at a time, page navigator 612 can include six 100-record segments. When a user selects a particular segment (e.g., segment 301-400), the client device can determine whether the data record buffer contains data records identified by the 301st through 400th record identifiers stored in the record identifier buffer. If the data records exist, the client can display the data records in data display section 604. If the data records do not exist, the client can send a data request to a server to retrieve the data records.

In addition, the controls in control section 602 can be utilized to facilitate transparent navigation through pages. Previous record button 606 and next record button 608 allow a user to navigate to a desired record without first navigating to a page containing the record. If a user clicks and holds on previous record button 606 or next record button 608, a menu can be displayed to allow the user to navigate to the first or last record, respectively. If the user navigates to a record off a current page using previous record button 606 or next record button 608, the page containing the desired record can be requested, loaded, and displayed. Page navigator 612 can be automatically updated to reflect a new record range that corresponds to the new page.

Input area 610 can also be configured to navigate a user to a new page transparently. When input area 610 receives an identifier for a record that is out of the current page, the page including the record identified by the identifier can be requested, loaded, and displayed. The record can be selected (e.g., highlighted) when the page is displayed in data display section 604. Page navigator 612 can be automatically updated to reflect a new record range that corresponds to the new page.

The paging mechanism can happen automatically in the background when an input is received through previous record button 606, next record button 608, or input area 610. The paging mechanism can be transparent to the user providing the input.

Exemplary Processes of Intelligent Data Caching

Figure 7:
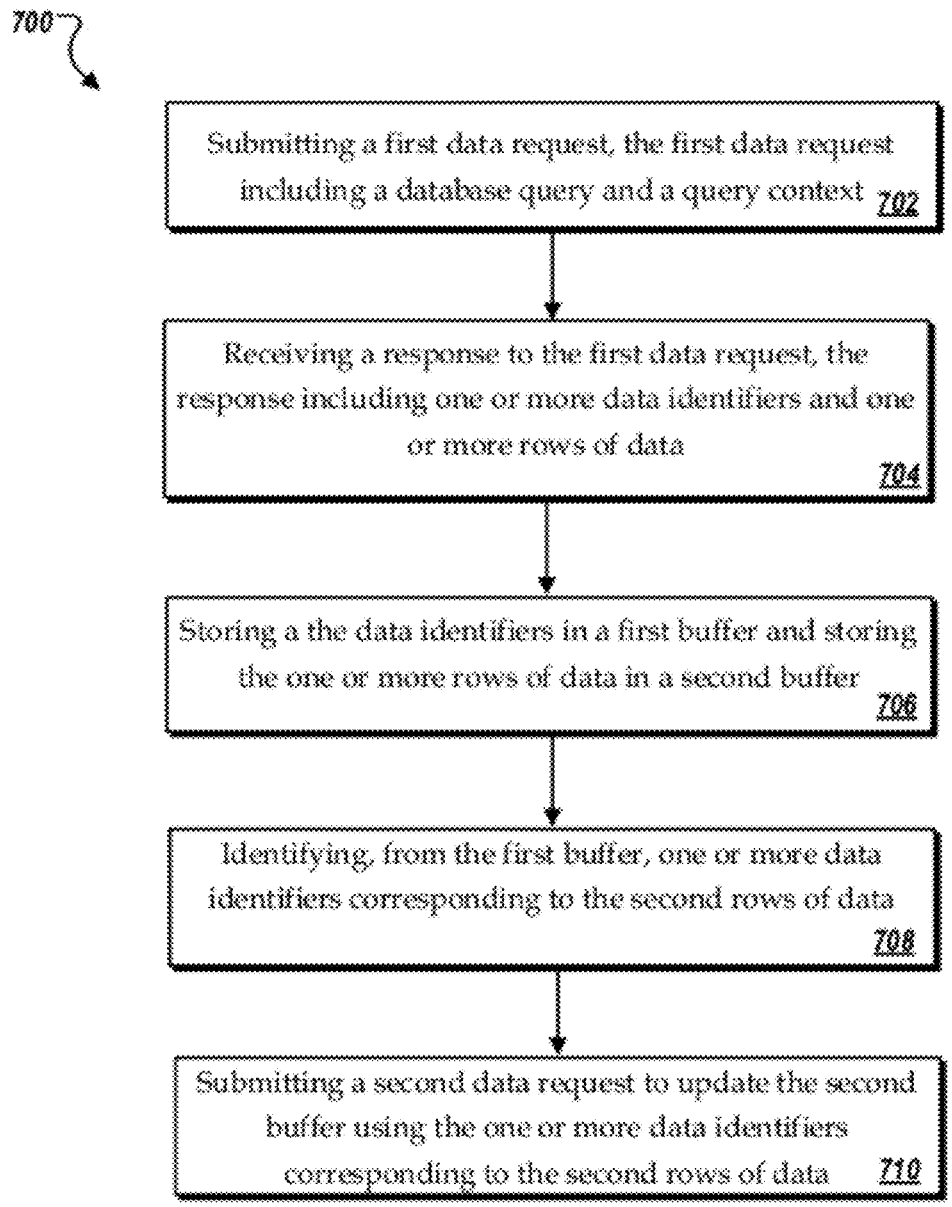
FIG. 7 is a flowchart illustrating an exemplary process of intelligent data caching performed on a client device.

FIG. 7 is a flowchart illustrating exemplary process of 700 intelligent data caching performed on a client. The client can include one or more data processing devices.

The client can submit (702) a first data request to a server. The first data request can include a database query and a query context (e.g., a query options data object). The query context can specify a quantity of first records of data to be retrieved from the database and a data offset specifying from which record of data the retrieval can start. The quantity of the first records can correspond to a number of data records to be displayed in a page. The first records can be rows data in a collection in the database.

The client can receive (704) a response to the first data request. The response can include one or more data identifiers and one or more records of data. The data identifiers can identify data records corresponding to a result set of the database query included in the first data request. The one or more data identifiers can be record identifiers from a relational database. The one or more records of data can include a portion of the result set that corresponds to the first records of data to be retrieved.

The client can store (706) the data identifiers in a first buffer, and store the one or more records of data in a second buffer. The first buffer can be a data identifier buffer. The second buffer can be a data record buffer. The second buffer can be empty and store no data record at certain times, e.g., when the second data buffer is created. The first buffer and second buffer can be implemented in various ways. For example, the first buffer and second buffer can share a continuous memory space or be spread among multiple memory spaces.

In some implementations, process 700 can include causing to be displayed in a browser at least a portion of content of the second buffer. For example, the second buffer can include 200 data records. The client can provide 100 of the data records for display in a display page if the display page has room for the 100 data records.

The client can receive an input selecting one or more second records of data to be retrieved. The input can include a page navigation input, a scroll input, or any input manipulating a displayed page of data records. For example, the client can receive a selection input from a browser, the selection input including a scrolling input scrolling to a portion of the result set corresponding to the one or more second records. In response to the input, the mobile device can identify (708), from the first buffer, one or more data identifiers corresponding to the second records of data. Identifying from the first buffer the one or more data identifiers corresponding to the second records of data can include identifying the one or more data identifiers corresponding to the second records of data based on a relative position of a slider of a scroll bar of a browser window and a total number of data identifiers in the first buffer.

The client can submit (710) a second data request to update the second buffer using the one or more data identifiers corresponding to the second records of data. Submitting a second data request includes submitting the one or more data identifiers corresponding to the second records of data to a server. The client can receive a response to the second data request. The response can include one or more records of data corresponding to the one or more data identifiers corresponding to the second records of data. The response can include data (e.g., a flag) that indicates that a record of data corresponding to a data identifier stored in the first buffer is deleted.

Figure 8:
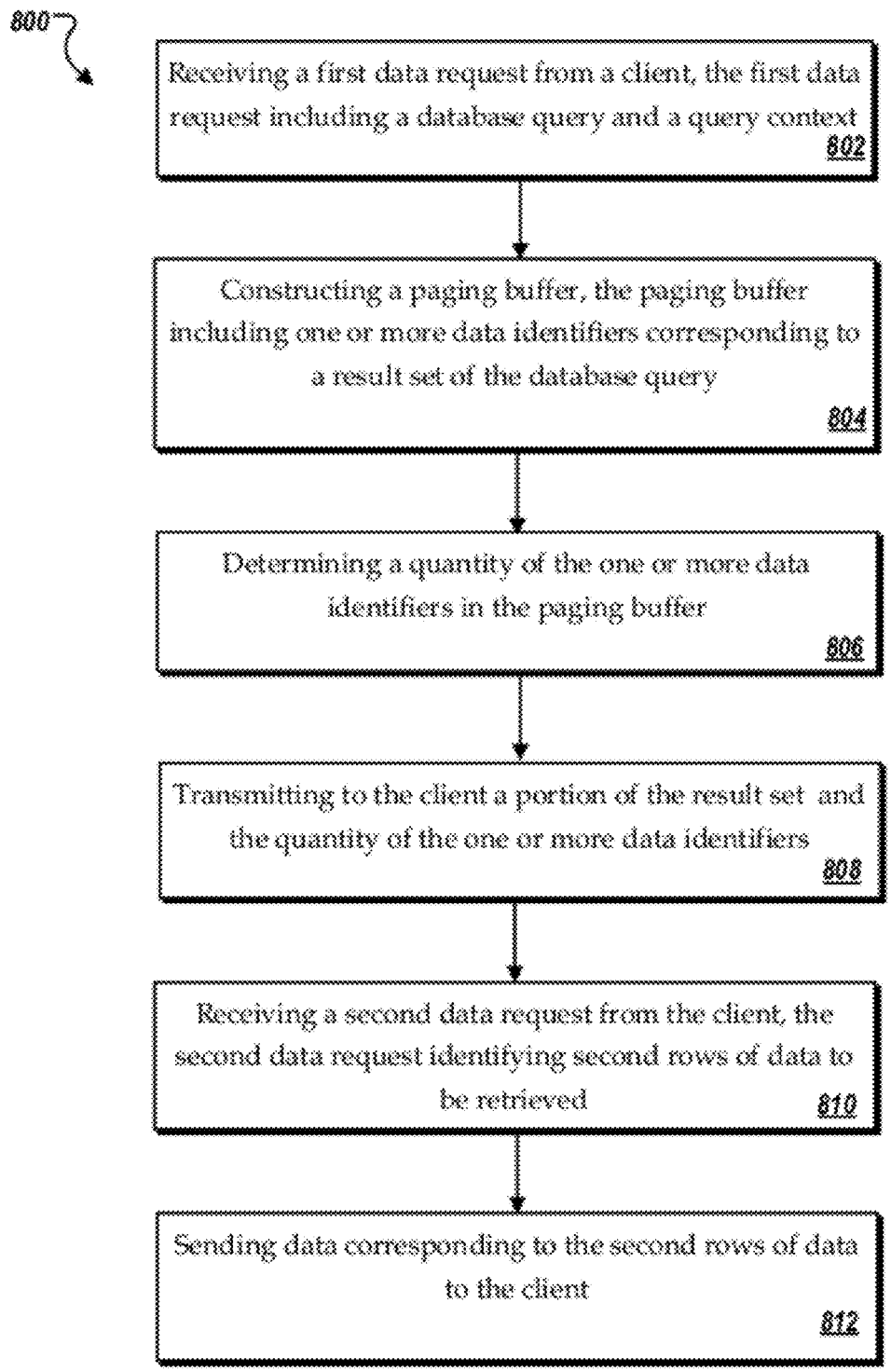
FIG. 8 is a flowchart illustrating an exemplary process of intelligent data caching performed on a server device.

FIG. 8 is a flowchart illustrating exemplary process 800 of intelligent data caching performed on a server. The server can include one or more data processing devices.

The server can receive (802) a first data request from a client. The first data request can include a database query and a query context. The query context can specify a quantity of first records of data to be retrieved and an offset of the records.

The server can construct (804) a paging buffer. The paging buffer can include one or more data identifiers corresponding to a result set of the database query. The paging buffer can correspond to the client and the query context. The data identifiers can include record identifiers identifying records of data in a relational database. The paging buffer can include data identifiers identifying deleted records of data in the relational database. Each of the data identifiers identifying a deleted record can be associated with a flag indicating that the record of data is deleted.

The server can determine (806) a quantity of the one or more data identifiers in the paging buffer, and determine a portion of the result set that corresponds to the first records. The server can transmit (808) to the client the portion of the result set and the quantity of the one or more data identifiers.

In some implementations, the server can receive (810) a second data request from the client. The second data request can identify one or more second records of data to be retrieved. The second data request includes at least one of a record offset or a record limit.

The server can send (812) data corresponding to the identifiers identifying the second records of data to the client. Sending data corresponding to the second records of data to the client includes sending a flag indicating that a record of data is inaccessible. The record of data can be a record whose row identifier was sent to the client in response to the first data request.

Exemplary System Architecture

Figure 9:
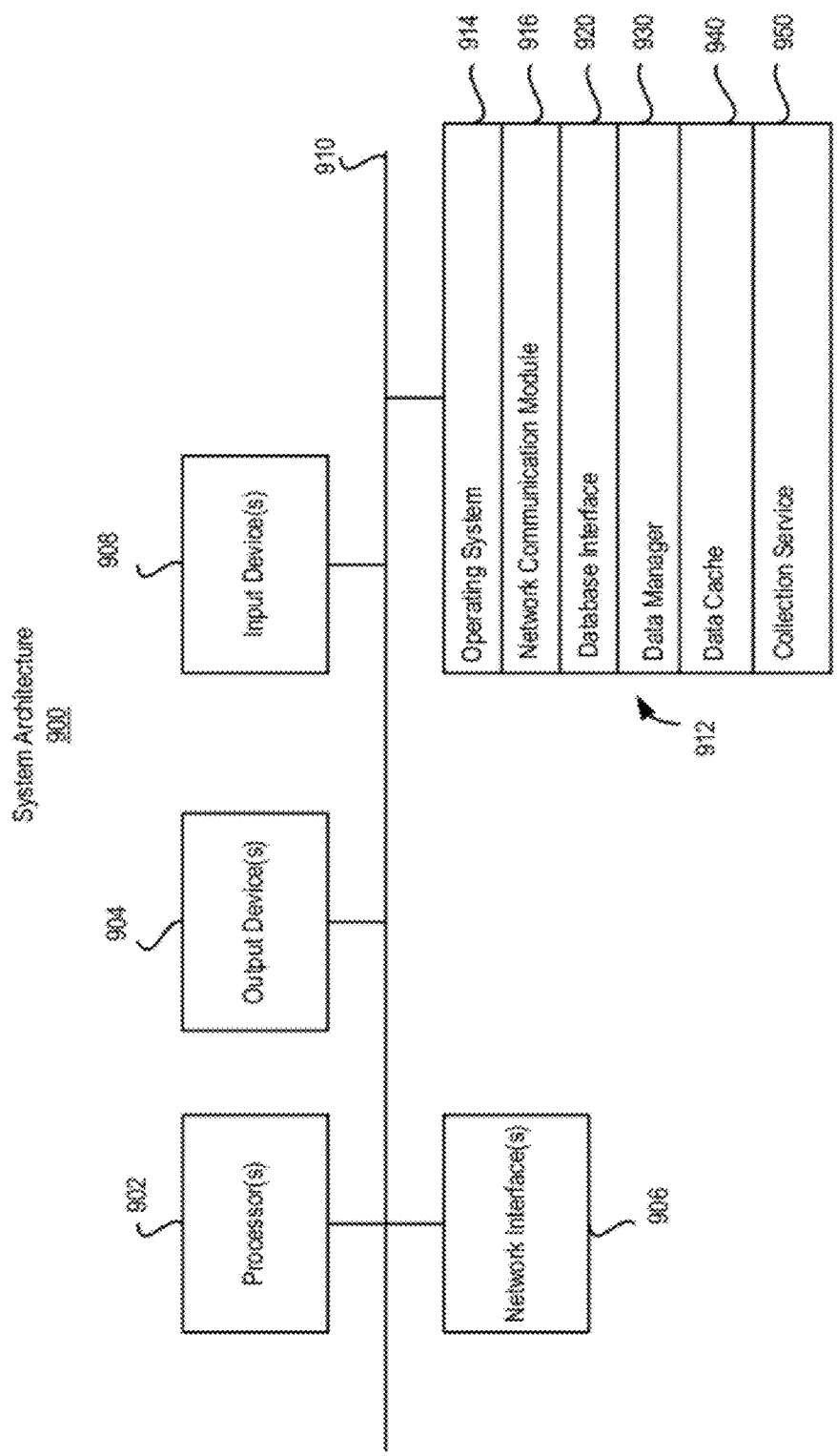
FIG. 9 is a block diagram of an exemplary system architecture for implementing the intelligent data caching features and operations.

FIG. 9 is a block diagram of an exemplary system architecture 900 for implementing the features and operations of dynamic parsing rule techniques. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to any medium that participates in providing instructions to processor 902 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 912 can further include operating system 914 (e.g., Mac OS® server, Windows® NT server), network communication module 916, database interface 920, data manager 930, data cache 940, and collection service 950. Database interface 920 can provide one or more user interfaces, interfaces between a server computer and a client computer, and interfaces between a relational database and another application program. Data manager 930 can perform various functions of intelligent data caching. Data cache 940 can include one or more paging buffers on a server device, or one or more data identifier buffers or data record buffers on a client device. Collection service 950 can include instructions that perform various functions for accessing data records in a relational database.

Operating system 914 can be multi-user, multiprocessing, multitasking, multithreading, real time, etc. Operating system 914 performs basic tasks, including but not limited to: recognizing input from and providing output to devices 904 and 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.). Database interface 920 can include interface to various databases including relational databases.

Architecture 900 can be included in any device capable of hosting a database application program. Architecture 900 can be implemented in a parallel processing or peer-to-peer infrastructure or on a single device with one or more processors. Software can include multiple software components or can be a single body of code.

The described features can be implemented advantageously in one or more computer program products that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

What is claimed is:

1. A method executed by one or more data processing devices, comprising:
   submitting a first data request, the first data request including a database query and a query context, the query having a query condition, the query context specifying which portion of a result set will be processed, the result set comprising data records retrieved based on the query condition upon execution of the query, wherein the query context includes an offset and a limit, the offset specifying a starting position of the result set, the limit specifying a number of data records in the portion;
   receiving a response to the first data request, the response including a plurality of data records, each data record including a data identifier, the data identifier identifying a corresponding data record in the result set, the one or more data records of the plurality of data records corresponding to the portion of the result set as specified in the query context, wherein only the one or more data records include data fields that are different from the data identifier;
   storing the data identifiers in a first buffer and storing the one or more data records in a second buffer for processing;
   in response to an input indicating that one or more data records that are different from the one or more data records stored in the second buffer will be processed, identifying, from the first buffer, one or more data identifiers corresponding to the one or more different data records; and
   submitting a second data request to update the second buffer, the second data request including a query for retrieving data fields of the one or more different data records using the one or more data identifiers corresponding to the different data records, the data fields being different from the data identifiers.

2. The method of claim 1, further comprising formatting at least a portion of content of the second buffer for displaying in a browser.

3. The method of claim 1, where the one more data identifiers are row identifiers of a database table.

4. The method of claim 1, further comprising:
   receiving a selection input from a browser, the selection input including a scrolling input scrolling displayed data records to a new set of displayed data records.

5. The method of claim 4, where identifying from the first buffer the one or more data identifiers corresponding to the one or more different data records is based on a relative position of a slider of a scroll bar of a browser window and a total number of data identifiers in the first buffer.

6. The method of claim 1, where the query for retrieving data records using the one or more data identifiers corresponding to the one or more different data records is different from the database query in the first data request.

7. The method of claim 6, further comprising:
   receiving a response to the second data request, the response including one or more data records corresponding to the one or more data identifiers corresponding to the one or more different data records.

8. The method of claim 7, where the response to the second data request includes data that indicates that a data record corresponding to one of the data identifiers corresponding to the one or more different data records is deleted.

9. The method of claim 1, comprising receiving, in response to the second data request, a flag indicating a data record is inaccessible.

10. A method executed by one or more data processing devices, comprising:
    receiving a first data request from a client, the first data request including a database query and a query context, the query having a query condition, the query context specifying which portion of a result set will be processed, the result set comprising data records retrieved based on the query condition upon execution of the query, wherein the query context includes an offset and a limit, the offset specifying a starting position of the result set, the limit specifying a number of data records in the portion;
    storing, in a paging buffer, a plurality of data identifiers identifying each data record in the result set, where the paging buffer corresponds to the client and the query context;
    identifying, based on the query context and from the result set, one or more data records corresponding to the portion of the result set specified in the query context; and
    transmitting, to the client, the portion of the result set and the data identifiers, wherein only the one or more data records corresponding to the portion of the result set include data fields that are other than the data identifiers.

11. The method of claim 10, where the data identifiers include row identifiers identifying data records of a database table.

12. The method of claim 10, where the paging buffer stores data identifiers identifying deleted data records in a relational database, the data identifiers identifying deleted data records each being associated with a flag indicating that the corresponding data record is deleted.

13. The method of claim 10, further comprising:
receiving a second data request from the client, the second data request specifying one or more data identifiers; and
sending data records corresponding to data identifiers specified in the second data request to the client.

14. The method of claim 13, where the second data request includes at least one of a record offset or a record limit.

15. The method of claim 13, where sending the data records corresponding to the data identifiers specified in the second request includes sending a flag indicating that a data record is inaccessible.

16. A non-transitory computer-readable medium storing a computer program product, the computer program product operable to cause one or more processors to perform operations comprising:
submitting a first data request, the first data request including a database query and a query context, the query having a query condition, the query context specifying a portion of a result set that will be processed, the result set comprising data records retrieved based on the query condition upon execution of the query, wherein the query context includes an offset and a limit, the offset specifying a starting position of the result set, the limit specifying a number of data records in the portion;
receiving a response to the first data request, the response including a plurality of data records, each data record including a data identifier, the data identifier identifying a corresponding data record in the result set, the one or more data records including the portion of the result set that correspond to the as specified in the query context, wherein only the one or more data records include data fields that are different from the data identifier;
storing the data identifiers in a first buffer and storing the one or more data records of data in a second buffer for processing;
in response to a selection input indicating that one or more data records that are different from the one or more data records stored in the second buffer will be processed, selecting, from the first buffer, one or more data identifiers corresponding to the one or more different data records; and
submitting a second data request to update the second buffer, the second data request including a query for retrieving data fields of the one or more different data records using the one or more data identifiers data records, the data fields being different from the data identifiers.

17. The non-transitory computer-readable medium of claim 16, where the one more data identifiers are row identifiers from a relational database.

18. The non-transitory computer-readable medium of claim 16, the operations comprising, in respond to the second data request, receiving at least a portion of the one or more different data records and a flag indicating a data record is inaccessible.

19. A non-transitory computer-readable medium storing a computer program product, the computer program product operable to cause one or more processors to perform operations comprising:
receiving a first data request from a client, the first data request including a database query and a query context, the query having a query condition, the query context specifying which portion of a result set will be processed, the result set comprising data records retrieved based on the query condition upon execution of the query, wherein the query context includes an offset and a limit, the offset specifying a starting position of the result set, the limit specifying a number of data records in the portion;
storing, in a paging buffer, a plurality of data identifiers identifying each data record in the result set, where the paging buffer corresponds to the client and the query context;
identifying, based on the offset and from the result set, the one or more data records corresponding to the portion of the result set specified in the query context; and
transmitting, to the client, the portion of the result set and the data identifiers, wherein only the one or more data records corresponding to the portion of the result set include data fields that are other than the data identifiers.

20. A system comprising:
one or more computers configured to perform operations comprising:
submitting a first data request, the first data request including a database query and a query context, the query having a query condition, the query context specifying which portion of a result set will be processed, the result set comprising data records retrieved based on the query condition upon execution of the query, wherein the query context includes an offset and a limit, the offset specifying a starting position of the result set, the limit specifying a number of data records in the portion;
receiving a response to the first data request, the response including a plurality of data records, each data record including a data identifier, the data identifier identifying a corresponding data record in the result set, the one or more data records including the portion of the result set as specified in the query context, wherein only the one or more data records include data fields that are different from the data identifier;
storing the data identifiers in a first buffer and storing the one or more data records in a second buffer;
in response to an input indicating one or more data records that are different from the one or more data records stored in the second buffer will be processed, identifying, from the first buffer, one or more data identifiers corresponding to the one or more different data records; and
submitting a second data request to update the second buffer, the second data request including a query for retrieving data fields of the one or more different data records using the one or more data identifiers corresponding to the different data records, the data fields being different from the data identifiers.

* * * * *